(12) United States Patent
Zhang et al.

(10) Patent No.: US 12,066,937 B2
(45) Date of Patent: Aug. 20, 2024

(54) METHOD, ELECTRONIC DEVICE AND COMPUTER PROGRAM PRODUCT FOR FLUSHING METADATA

(71) Applicant: EMC IP Holding Company LLC, Hopkinton, MA (US)

(72) Inventors: Ming Zhang, Beijing (CN); Chen Gong, Beijing (CN); Qiaosheng Zhou, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 196 days.

(21) Appl. No.: 17/746,367

(22) Filed: May 17, 2022

(65) Prior Publication Data

US 2023/0086991 A1 Mar. 23, 2023

(30) Foreign Application Priority Data

Sep. 18, 2021 (CN) .......................... 202111112176.2

(51) Int. Cl.
*G06F 12/0802* (2016.01)
*G06F 3/06* (2006.01)
*G06F 16/172* (2019.01)

(52) U.S. Cl.
CPC ........ *G06F 12/0802* (2013.01); *G06F 3/0604* (2013.01); *G06F 3/0659* (2013.01); *G06F 3/067* (2013.01); *G06F 16/172* (2019.01); *G06F 2212/60* (2013.01)

(58) Field of Classification Search
CPC ............. G06F 12/0802; G06F 2212/60; G06F 3/0604; G06F 3/0659; G06F 3/067; G06F 12/0891; G06F 12/0895
See application file for complete search history.

(56) References Cited

U.S. PATENT DOCUMENTS

| | | | |
|---|---|---|---|
| 9,697,219 B1 * | 7/2017 | Wang | G06F 16/1734 |
| 9,934,163 B1 | 4/2018 | Armangau et al. | |
| 10,810,123 B1 | 10/2020 | Xu et al. | |
| 2021/0141554 A1 * | 5/2021 | Koo | G06F 3/0656 |
| 2021/0248124 A1 | 8/2021 | Tobin et al. | |
| 2022/0027059 A1 | 1/2022 | Chen et al. | |
| 2022/0342826 A1 * | 10/2022 | Cariello | G06F 13/1668 |

OTHER PUBLICATIONS

Zhou, Qiaosheng, et al.; "Method, Electronic Device, and Computer Program Product for Flushing Data," U.S. Appl. No. 17/824,317, filed May 25, 2022.

* cited by examiner

*Primary Examiner* — Jane W Benner
(74) *Attorney, Agent, or Firm* — BainwoodHuang

(57) ABSTRACT

Techniques for flushing metadata involve: receiving a flushing request, the flushing request instructing to flush metadata in at least one cache region to a persistent storage device; acquiring a plurality of target indicators, the target indicator at least indicating a type of a cache region and a block in the cache region, where the plurality of target indicators are classified based on types of cache regions indicated by the target indicators among the plurality of target indicators; determining, from the plurality of target indicators, at least one target indicator of the same type as the at least one cache region; and flushing metadata in a block indicated by the at least one target indicator. Such techniques avoid flushing a cache region that does not need to be flushed, shortens the response time to the flushing request, and reduces the occupancy of system resources.

20 Claims, 5 Drawing Sheets

METHOD, ELECTRONIC DEVICE AND COMPUTER PROGRAM PRODUCT FOR FLUSHING METADATA

CROSS-REFERENCE TO RELATED APPLICATION

This application claims priority to Chinese Patent Application No. CN202111112176.2, on file at the China National Intellectual Property Administration (CNIPA), having a filing date of Sep. 18, 2021, and having "METHOD, ELECTRONIC DEVICE AND COMPUTER PROGRAM PRODUCT FOR FLUSHING METADATA" as a title, the contents and teachings of which are herein incorporated by reference in their entirety.

TECHNICAL FIELD

Embodiments of the present disclosure relate to the field of data flushing of a file system, and more specifically to a method, an electronic device, and a computer program product for flushing metadata.

BACKGROUND

Metadata is a backbone of a file system. Most file systems change metadata by a transaction to maintain the consistency of metadata changes. Such a transaction requires metadata change summary to be written into a special device (referred to as a log device for most file systems) before an actual metadata change is made by a metadata cache. When a file system is disordered or accidentally shut down (which means that the metadata cache does not have time to flush metadata changes to a disk), the file system will perform log playback. During log playback, a program reads from the log device and changes a related metadata cache according to change summary inside the log device. After log playback, the file system returns to the state before the disorder or accidental shut-down.

SUMMARY

In a first aspect of the present disclosure, a method for flushing metadata in a file system is provided. The method includes receiving a flushing request, the flushing request instructing to flush metadata in at least one cache region to a persistent storage device. The method further includes acquiring a plurality of target indicators, the target indicator at least indicating a type of a cache region and a block in the cache region, where the plurality of target indicators are classified based on types of cache regions indicated by the target indicators among the plurality of target indicators. The method further includes determining, from the plurality of target indicators, at least one target indicator of the same type as the at least one cache region. The method further includes flushing metadata in a block indicated by the at least one target indicator.

In a second aspect of the present disclosure, an electronic device is provided. The electronic device includes a processor and a memory coupled to the processor. The memory contains instructions stored therein. The instructions, when executed by the processor, cause the device to execute an action. The action includes receiving a flushing request, the flushing request instructing to flush metadata in at least one cache region to a persistent storage device. The action further includes acquiring a plurality of target indicators, the target indicator at least indicating a type of a cache region and a block in the cache region, where the plurality of target indicators are classified based on types of cache regions indicated by the target indicators among the plurality of target indicators. The action further includes determining, from the plurality of target indicators, at least one target indicator of the same type as the at least one cache region. The action further includes flushing metadata in a block indicated by the at least one target indicator.

In a third aspect of the present disclosure, a computer program product is provided. The computer program product is tangibly stored on a computer-readable medium and includes machine-executable instructions. The machine-executable instructions, when executed, cause a machine to execute the method according to the first aspect.

The Summary is provided to introduce selections of concepts in a simplified form, which will be further described in the Detailed Description below. The Summary is neither intended to identify key features or major features of the present disclosure, nor intended to limit the scope of the present disclosure.

BRIEF DESCRIPTION OF THE DRAWINGS

By more detailed description of example embodiments of the present disclosure with reference to the accompanying drawings, the above and other objectives, features, and advantages of the present disclosure will become more apparent, where identical reference numerals generally represent identical components in the example embodiments of the present disclosure. In the figures.

DETAILED DESCRIPTION

Figure 1:
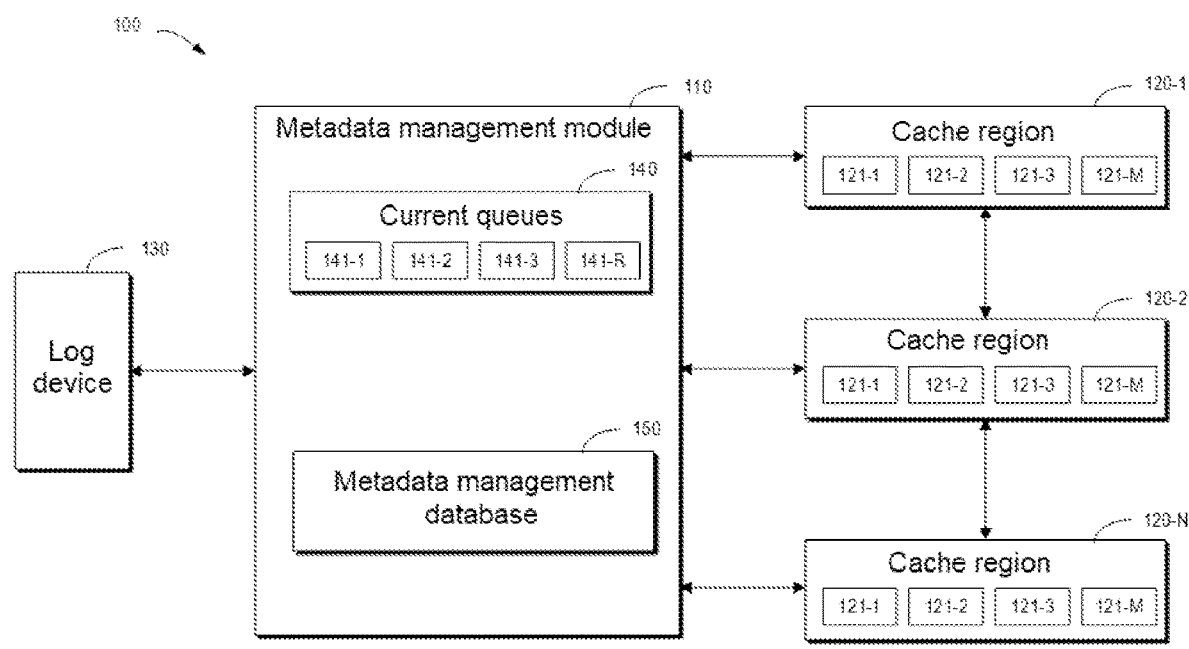
FIG. 1 shows a schematic diagram of an example environment in which an embodiment of the present disclosure may be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The principles of the present disclosure will be described below with reference to some example embodiments shown in the accompanying drawings. While the figures show preferred embodiments of the present disclosure, it should be understood that these embodiments are described merely to enable those skilled in the art to better understand and then implement the present disclosure, and are not intended to impose any limitation on the scope of the present disclosure.

The term "including" and variations thereof used herein denote open-ended inclusion, i.e., "including, but not limited to." Unless otherwise specifically stated, the term "or" denotes "and/or."

The term "based on" denotes "at least partially based on." The terms "an example embodiment" and "an embodiment" denote "at least one example embodiment." The term "another embodiment" denotes "at least one additional embodiment." The terms "first," "second," and the like may refer to different or identical objects. Other explicit and implicit definitions may be further included below.

When initiating a transaction, a program will generate several change notices after finishing writing into a log device. The change notice indicates a cache in which a related metadata change is to be made. The change notice includes a type of the cache and an index of cached metadata. There are two queues for metadata management: a current queue and a synchronous queue. When a transaction is completed, the program will append the change notice to the current queue. Under several circumstances, a metadata management module may be triggered to start to flush metadata. For example, a timer reaches a preset time, one cache among a plurality of types of caches reaches a traffic limit, and so on. When the metadata management module determines to flush metadata, change notices in the current queue will be appended to the synchronous queue in the same time sequence as in the current queue, and several flushing threads will be initiated to process the synchronous queue. For these flushing threads, one change notice will be acquired each time. The flushing thread will invoke a relevant cache flushing application programming interface (API) based on the cache type and index in the change notice, thereby flushing metadata from a corresponding cache to a disk (such as a hard disk). Before flushing, corresponding metadata change summary in the log device is marked as active. After flushing is completed, the corresponding metadata change summary in the log device will be marked as inactive. The log size of the log device indicates the size of the metadata change summary marked as active. The smaller the log size, the better. The log size reaching a certain threshold may also trigger a flushing request.

The above flushing method has been implemented for many years. When the metadata flushing pressure is low, this flushing method has very good effects. For high-pressure flushing circumstances, such as a hybrid pool file system and background data deduplication, the following defects are shown.

Blind flushing: Regardless of the circumstances under which the flushing request is triggered, the metadata management module will flush metadata in all caches indicated by the change notices. For a cache that does not need to be flushed, this will cause unnecessary workload.

Repeated flushing: Assuming that two transactions change the same block, there will be two change notices indicating the same block. After the two change notices are appended to the synchronous queue from the current queue, two flushing requests will be initiated, but in fact, only one flushing request is enough.

The embodiment of the present disclosure presents a metadata flushing solution to solve the above problems and one or more of other potential problems. According to embodiments of the present disclosure, a flushing request instructing to flush metadata in at least one cache region is received, and a plurality of target indicators classified based on the types of the cache regions is acquired. The target indicator at least indicates a type of a cache region and a block in the cache region. Instead of flushing metadata in the blocks indicated by all of the acquired target indicators, at least one target indicator of the same type as the at least one cache region is determined from the classified plurality of target indicators. Then, metadata in a block indicated by the at least one target indicator is flushed.

According to embodiments described herein, such targeted flushing can avoid flushing a cache region that does not need to be flushed, shorten the response time to the flushing request, and reduce the occupancy of system resources.

The basic principles and some example implementations of the present disclosure will be described below with reference to the accompanying drawings. It should be understood that these example embodiments are provided merely to enable those skilled in the art to better understand and then implement embodiments of the present disclosure, and are not intended to impose any limitation on the scope of the present disclosure.

FIG. 1 shows a schematic diagram of an example environment in which an embodiment of the present disclosure may be implemented. As shown in FIG. 1, environment 100 includes metadata management module 110, log device 130, cache region 120-1, cache region 120-2, and cache region 120-N (also collectively or individually referred to as "cache regions 120"), where N is a natural number.

Metadata management module 110 at least includes current queue 140 and metadata management database 150. Although current queue 140 and metadata management database 150 are illustrated in FIG. 1 as being integrated with metadata management module 110, their arrangement is not limited to this arrangement. Current queue 140, metadata management database 150, and metadata management module 110 may also be separately arranged.

Metadata is stored in cache regions 120. Depending on different types of stored metadata, types of a plurality of cache regions 120 are also different. Metadata of the same type is stored in cache regions 120 of the same type. Each cache region 120 includes block 121-1, block 121-2, block 121-3, and block 121-M (also collectively or individually referred to as "blocks 121"), where M is a natural number. Metadata is stored in blocks 121.

When a program initiates a transaction, log device 130 records summary of changes made to the metadata by the transaction. When a transaction is completed, the program will append target indicator 141-R to a tail end of current queue 140, as shown in FIG. 1. In current queue 140, target indicator 141-1, target indicator 141-2, and target indicator 141-3 are before target indicator 141-R. Target indicator 141-1, target indicator 141-2, target indicator 141-3, and target indicator 141-R may be collectively or individually referred to as "target indicators 141," where R is a natural number. Each target indicator 141 corresponds to one transaction. Each target indicator at least indicates a type of a cache region where metadata changed by a corresponding transaction is located, and indicates a block in the cache region in which the changed metadata is stored.

If the log size of log device 130 reaches a threshold, log device 130 sends a flushing request to metadata management module 110. The flushing request at least indicates which cache regions contain metadata to be flushed to a persistent storage device. When cache region 120 reaches a traffic limit, metadata management module 110 may also be triggered to perform flushing, i.e., metadata management module 110 is requested to flush metadata in the cache region 120 to the persistent storage device. Alternatively, when a timer (not shown in the figure) reaches a preset time, metadata management module 110 may also be triggered to perform flushing.

It should be understood that the structure and function of environment 100 are described for example purposes only, and do not imply any limitation to the scope of the present disclosure. For example, the embodiment of the present disclosure may also be applied to an environment different from environment 100. In addition, FIG. 1 only shows three cache regions and one log device, but the number of cache regions is not limited to three, nor is the number of log devices limited to one. There may be more or fewer cache regions and log devices. Similarly, FIG. 1 only shows four blocks in each cache region, but the number of blocks in each cache region is not limited to four. There may be more or fewer blocks in each cache region. The number of blocks in each cache region may be the same as or different from each other. FIG. 1 only shows four target indicators in the current queue, but the number of target indicators in the current queue is not limited to four. There may be more or fewer target indicators in the current queue.

Figure 2:
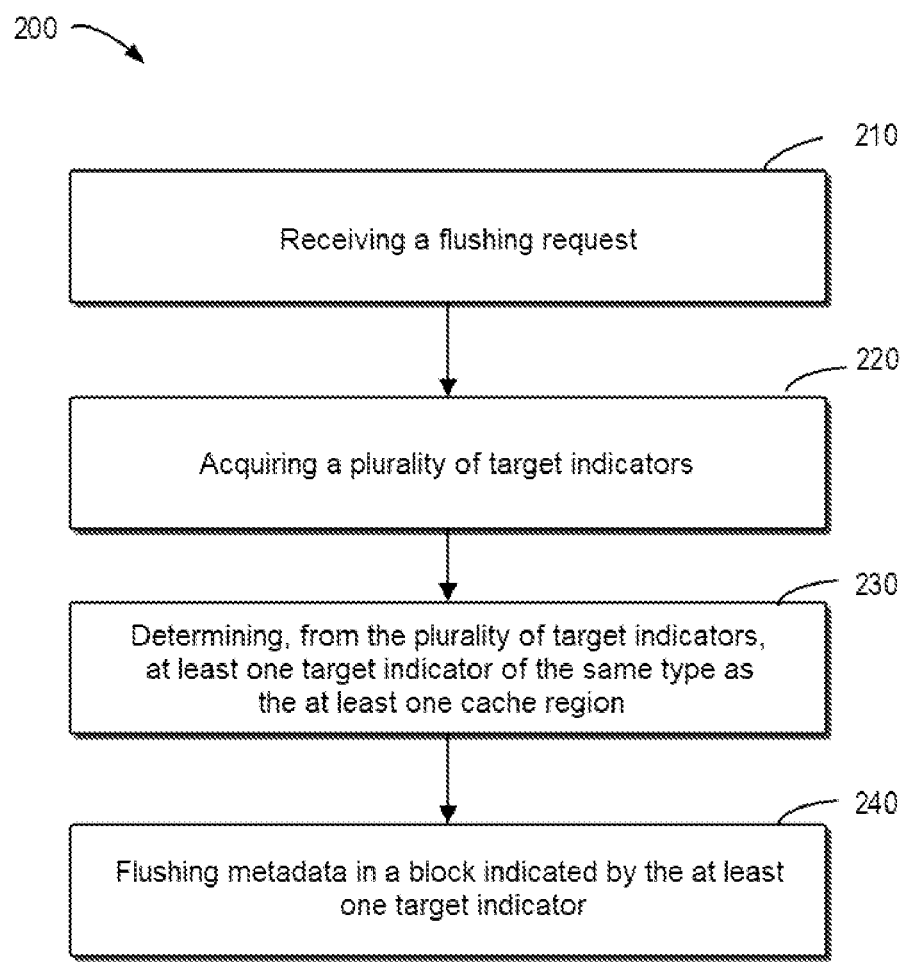
FIG. 2 shows a flow chart of an example method for flushing metadata according to an embodiment of the present disclosure.
Figure 3A:
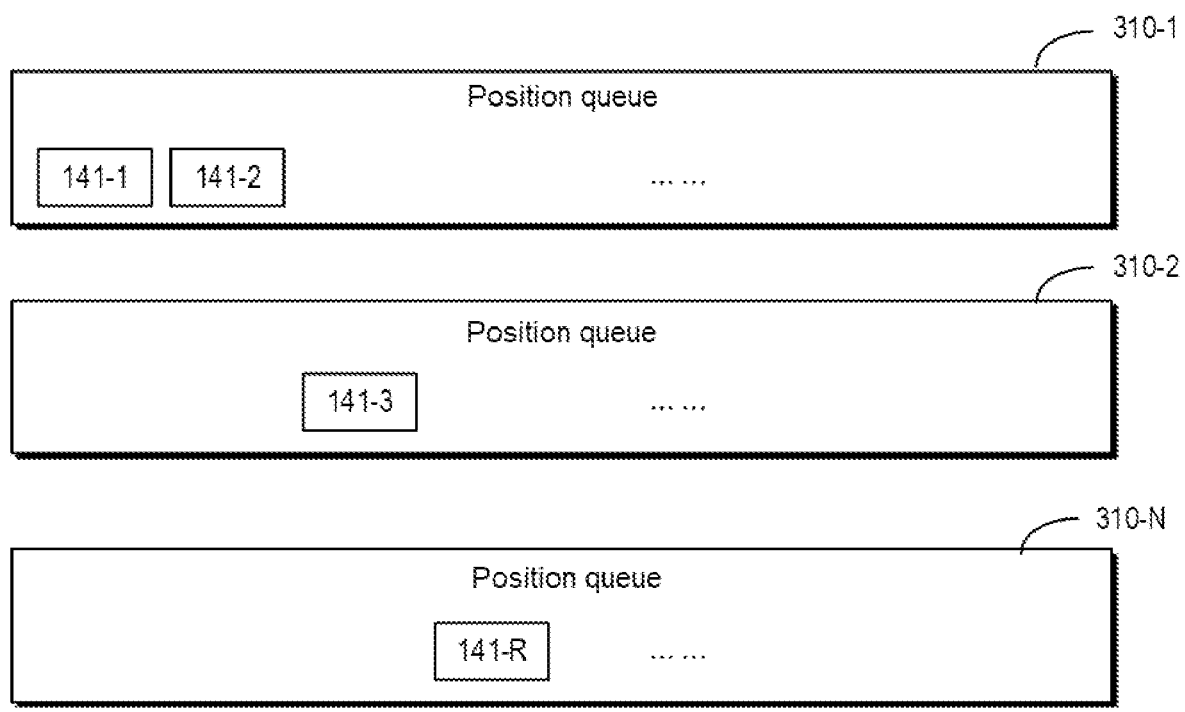
FIG. 3A and FIG. 3B show schematic diagrams of a metadata management database according to some embodiments of the present disclosure.
Figure 3B:
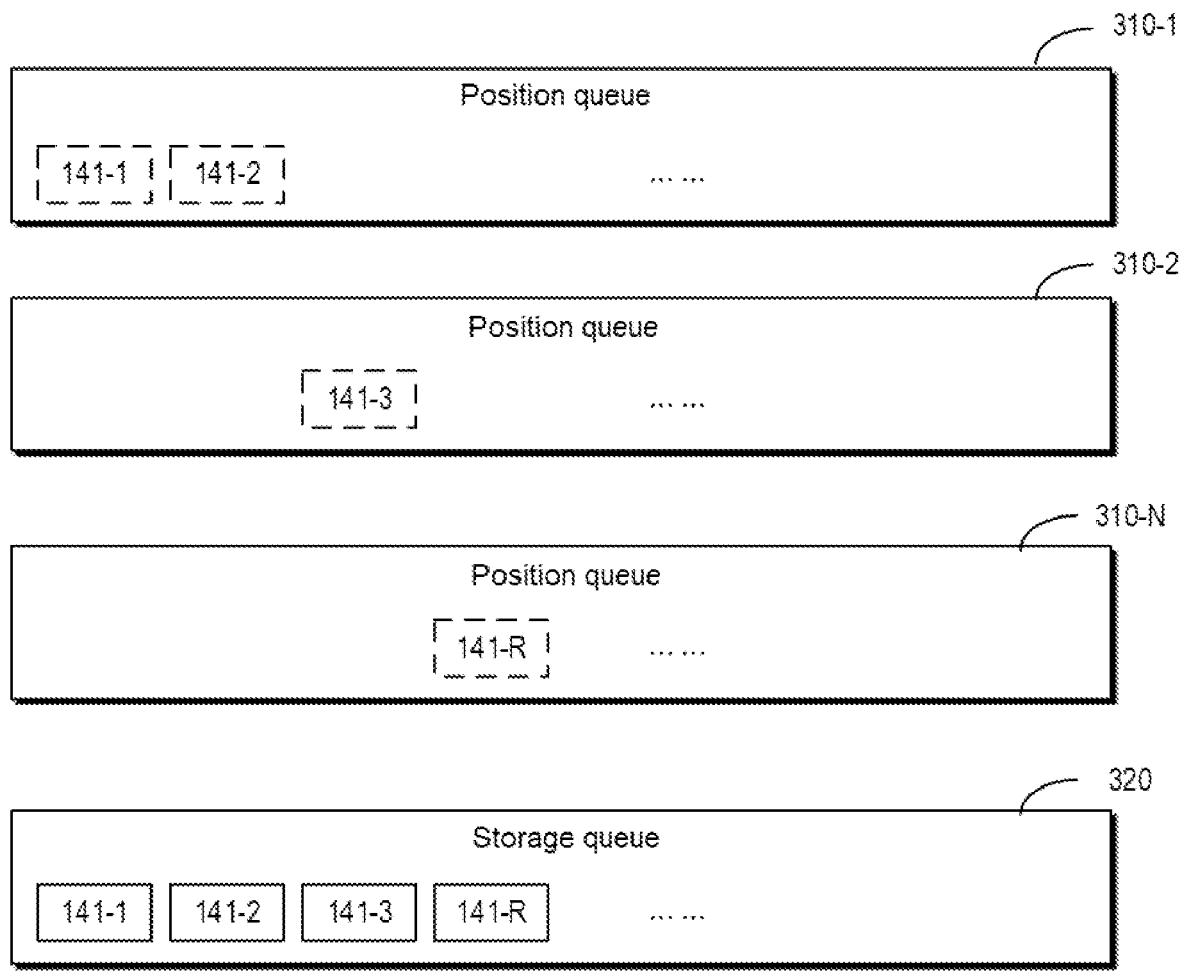

FIG. 2 shows a flow chart of example method 200 for flushing metadata according to an embodiment of the present disclosure. Method 200 may be implemented by, e.g., metadata management module 110 as shown in FIG. 1. It should be understood that method 200 may further include additional actions that are not shown and/or may omit actions that are shown, and the scope of the present disclosure is not limited in this respect. FIG. 3A and FIG. 3B show schematic diagrams of metadata management database 150 according to some embodiments of the present disclosure. Method 200 will be described in detail below with reference to FIG. 1, FIG. 3A, and FIG. 3B.

Block 210: receiving a flushing request. The flushing request instructs to flush metadata in at least one cache region 120 (e.g., cache region 120-1 and cache region 120-N as shown in FIG. 1) to a persistent storage device. The flushing request may be from log device 130 and/or cache region 120 as shown in FIG. 1.

Block 220: acquiring a plurality of target indicators. The target indicator at least indicates a type of a cache region and a block in the cache region. The plurality of target indicators are classified based on types of cache regions indicated by the target indicators among the plurality of target indicators.

As shown in FIG. 1 and FIG. 3A, in some embodiments, a plurality of target indicators 141 from current queue 140 may be classified as follows. Based on the number of types of cache regions 120 indicated by the plurality of target indicators 141, position queues corresponding to the number of types are established. For example, in FIG. 1, cache region 120-1 is a first type of cache region, cache region 120-2 is a second type of cache region, and cache region 120-N is a third type of cache region. Based on the number of types of cache regions being 3, position queue 310-1, position queue 310-2, and position queue 310-N (also collectively or individually referred to as "position queues 310") as shown in FIG. 3A are established in metadata management database 150. Then, based on the types of the cache regions indicated by target indicator 141-1, target indicator 141-2, target indicator 141-3, and target indicator 141-R, target indicators 141 are put into position queues 310 of corresponding types respectively, as shown in FIG. 3A.

As shown in FIG. 1 and FIG. 3B, in some embodiments, the plurality of target indicators 141 from current queue 140 may also be classified as follows. Storage queue 320 is established in metadata management database 150, and the plurality of target indicators 141 from current queue 140 are stored in storage queue 320. For example, target indicator 141-1, target indicator 141-2, target indicator 141-3, and target indicator 141-R are transferred from current queue 140 to storage queue 320. Then, based on the number (e.g., 3 as shown in FIG. 1) of types of cache regions 120 indicated by the plurality of target indicators 141, position queues 310-1, 310-2, and 310-N corresponding to the number of types are established in metadata management database 150. Then, based on the types of the cache regions indicated by target indicator 141-1, target indicator 141-2, target indicator 141-3, and target indicator 141-R, storage positions of target indicators 141 in storage queue 320 are recorded in position queues 310 of corresponding types, as shown in FIG. 3B.

Further referring to FIG. 2, block 230: determining, from the plurality of target indicators, at least one target indicator of the same type as the at least one cache region. Then, block 240: flushing metadata in a block indicated by the at least one target indicator. For example, target indicators 141-1 and 141-2 are determined to be of the same type as cache region 120-1 in FIG. 1, and target indicator 141-3 is determined to be of the same type as cache region 120-N in FIG. 1. Data in block 121-2 of cache region 120-1 indicated by target indicator 141-1 and data in block 121-1 of cache region 120-1 indicated by target indicator 141-2 are flushed, to complete the flushing request for cache region 120-1; and data in block 121-3 of cache region 120-N indicated by target indicator 141-3 is flushed, to complete the flushing request for cache region 120-N.

Thus avoiding flushing a cache region that does not need to be flushed, shortening the response time to the flushing request, and reducing the occupancy of system resources.

In some embodiments, the target indicators may also be aggregated based on at least one strip in cache regions 120. Each strip may include 8 consecutive blocks in the cache region. As shown in FIG. 3A, in some embodiments, when metadata in a block indicated by target indicator 141-2 among the plurality of target indicators 141 is to be flushed, whether other target indicators 141 in the same position queue 310-1 as target indicator 141-2 indicate the same block is determined. If other target indicators 141 in the same position queue 310-1 as target indicator 141-2 indicate the same block, these target indicators may be aggregated in position queue 310-1. For example, other target indicators that indicate the same block as target indicator 141-2 may be removed, and only target indicator 141-2 remains in position queue 310-1.

Similarly, as shown in FIG. 3B, in some embodiments, when the metadata in the block indicated by target indicator 141-2 among the plurality of target indicators 141 is to be flushed, whether other target indicators 141 indicate the same block as target indicator 141-2 is determined. Storage positions of other target indicators 141 in storage queue 320 and a storage position of target indicator 141-2 in storage queue 320 are recorded in the same position queue 310-1. If other target indicators 141 indicating the same block as target indicator 141-2 is determined, these target indicators may be aggregated in position queue 310-1. For example, the storage positions of other target indicators 141 that indicate the same block as target indicator 141-2 may be removed from position queue 310-1.

In this way, even if a plurality of transactions changes the same block to generate a plurality of target indicators indicating the same block, the efficiency of flushing may be effectively improved by aggregating the target indicators.

As shown in FIG. 3A, in some embodiments, when metadata in a block indicated by target indicator 141-1 among the plurality of target indicators 141 is to be flushed, a strip (not shown in the figure) where the block is located is checked. It is found that another block in the strip is the block indicated by target indicator 141-2, and target indicator 141-2 and target indicator 141-1 are located in the same position queue 310-1. Therefore, the block indicated by target indicator 141-1 and the block indicated by target indicator 141-2 may be flushed using the same thread.

Similarly, in some embodiments, whether a second block indicated by a second target indicator exists in a strip where a first block indicated by a first target indicator among the at least one target indicator is located is determined, and a storage position of the second target indicator in the storage queue and a storage position of the first target indicator in the storage queue are recorded in the same position queue. Then, in response to determining that the second block indicated by the second target indicator exists in the strip where the first block is located, metadata in the second block and metadata in the first block are flushed using the same thread.

In this way, metadata in a plurality of blocks may be flushed using one thread, thereby shortening the response time to the flushing request, and reducing the occupancy of system resources.

Figure 4:
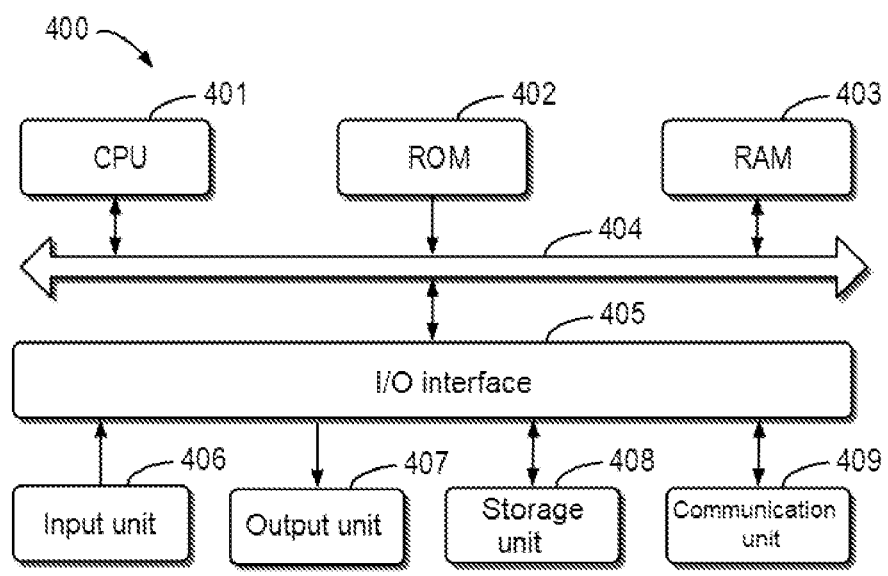
FIG. 4 shows a block diagram of an example device that may be configured to implement embodiments of the present disclosure.

FIG. 4 shows a schematic block diagram of example device 400 that may be configured to implement embodiments of contents of the present disclosure. For example, metadata management module 110 as shown in FIG. 1 may be included in device 400. As shown in FIG. 4, device 400 includes central processing unit (CPU) 401, which may execute various appropriate actions and processes in accordance with computer program instructions stored in read-only memory (ROM) 402 or computer program indications loaded into random-access memory (RAM) 403 from storage unit 408. RAM 403 may further store various programs and data required by operations of device 400. CPU 401, ROM 402, and RAM 403 are connected to each other through bus 404. Input/output (I/O) interface 405 is also connected to bus 404.

A number of components in device 400 are connected to I/O interface 405, including: input unit 406, such as a keyboard or a mouse; output unit 407, such as various types of displays or speakers; storage unit 408, such as a magnetic disk or an optical disk; and communication unit 409, such as a network card, a modem, or a wireless communication transceiver. Communication unit 409 allows device 400 to exchange information/data with other devices through a computer network such as the Internet and/or various telecommunication networks.

The various processes and processing described above, for example, method 200, may be executed by processing unit 401. For example, in some embodiments, method 200 may be implemented as a computer software program that is tangibly included in a machine-readable medium such as storage unit 408. In some embodiments, some or all of the computer programs may be loaded and/or installed onto device 400 via ROM 402 and/or communication unit 409. When the computer program is loaded into RAM 403 and executed by CPU 401, one or more actions of method 200 described above may be implemented.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a random access memory (RAM), a read-only memory (ROM), an erasable programmable read-only memory (EPROM or flush memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the above. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In the case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described herein with reference to flow charts and/or block diagrams of the method, the apparatus (system), and the computer program product implemented according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

The embodiments of the present disclosure have been described above. The above description is illustrative, rather than exhaustive, and is not limited to the disclosed various embodiments. Numerous modifications and alterations are apparent to those of ordinary skill in the art without departing from the scope and spirit of the illustrated embodiments. The selection of terms used herein is intended to best explain the principles and practical applications of the various embodiments or the improvements to technologies on the market, or to enable other persons of ordinary skill in the art to understand the embodiments disclosed herein.

The invention claimed is:

1. A method for flushing metadata in a file system, comprising:
   receiving a flushing request, the flushing request instructing to flush metadata in at least one cache region to a persistent storage device;
   acquiring a plurality of target indicators, the target indicator at least indicating a type of a cache region and a block in the cache region, wherein the plurality of target indicators are classified based on types of cache regions indicated by the target indicators among the plurality of target indicators;
   determining, from the plurality of target indicators, at least one target indicator of the same type as the at least one cache region; and
   flushing metadata in a block indicated by the at least one target indicator;
   wherein the plurality of target indicators are classified as follows:
   establishing, based on the number of types of cache regions indicated by the plurality of target indicators, position queues corresponding to the number of types; and
   putting, based on the type of the cache region indicated by each target indicator among the plurality of target indicators, the target indicator into a position queue of a corresponding type.

2. The method according to claim 1, wherein the method further comprises:
   flushing, in response to the flushing request, a plurality of cache regions simultaneously for a plurality of the position queues.

3. The method according to claim 1 wherein receiving the flushing request includes:
   acquiring the flushing request in response to a size of a log device reaching a threshold, the log device being constructed and arranged to record a summary of metadata changes from a set of transactions.

4. The method according to claim 1 wherein receiving the flushing request includes:
   acquiring the flushing request in response to the at least one cache region reaching a traffic limit.

5. The method according to claim 1 wherein receiving the flushing request includes:
   acquiring the flushing request in response to expiration of a timer reaching a preset time.

6. A method for flushing metadata in a file system, comprising:
   receiving a flushing request, the flushing request instructing to flush metadata in at least one cache region to a persistent storage device;
   acquiring a plurality of target indicators, the target indicator at least indicating a type of a cache region and a block in the cache region, wherein the plurality of target indicators are classified based on types of cache regions indicated by the target indicators among the plurality of target indicators;
determining, from the plurality of target indicators, at least one target indicator of the same type as the at least one cache region; and
flushing metadata in a block indicated by the at least one target indicator;
wherein the plurality of target indicators are classified as follows:
establishing a storage queue;
storing the acquired plurality of target indicators in the storage queue;
establishing, based on the number of types of cache regions indicated by the plurality of target indicators, position queues corresponding to the number of types; and
recording, based on the type of the cache region indicated by each target indicator among the plurality of target indicators, a storage position of the target indicator in the storage queue into a position queue of a corresponding type.

7. The method according to claim 6, wherein the method further comprises:
flushing, in response to the flushing request, a plurality of cache regions simultaneously for a plurality of the position queues.

8. The method according to claim 6, wherein the method further comprises:
determining whether a second block indicated by a second target indicator exists in a strip where a first block indicated by a first target indicator among the at least one target indicator is located, a first storage position of the first target indicator in the storage queue and a second storage position of the second target indicator in the storage queue being recorded in the same position queue; and
flushing, in response to determining that the second block indicated by the second target indicator exists in the strip where the first block is located, metadata in the second block and metadata in the first block using the same thread.

9. The method according to claim 6 wherein receiving the flushing request includes:
acquiring the flushing request in response to a size of a log device reaching a threshold, the log device being constructed and arranged to record a summary of metadata changes from a set of transactions.

10. The method according to claim 6 wherein receiving the flushing request includes:
acquiring the flushing request in response to the at least one cache region reaching a traffic limit.

11. The method according to claim 6 wherein receiving the flushing request includes:
acquiring the flushing request in response to expiration of a timer reaching a preset time.

12. An electronic device, comprising:
a processor; and
a memory coupled to the processor, the memory containing instructions stored therein, the instructions, when executed by the processor, causing the device to execute an action, the action comprising:
receiving a flushing request, the flushing request instructing to flush metadata in at least one cache region to a persistent storage device;
acquiring a plurality of target indicators, the target indicator at least indicating a type of a cache region and a block in the cache region, wherein the plurality of target indicators are classified based on types of cache regions indicated by the target indicators among the plurality of target indicators;
determining, from the plurality of target indicators, at least one target indicator of the same type as the at least one cache region; and
flushing metadata in a block indicated by the at least one target indicator;
wherein the plurality of target indicators are classified as follows:
establishing, based on the number of types of cache regions indicated by the plurality of target indicators, the position queues corresponding to the number of types; and
putting, based on the type of the cache region indicated by each target indicator among the plurality of target indicators, the target indicator into a position queue of a corresponding type.

13. The device according to claim 12, wherein the action further comprises:
flushing, in response to the flushing request, a plurality of cache regions simultaneously for a plurality of the position queues.

14. The device according to claim 12 wherein receiving the flushing request includes:
acquiring the flushing request in response to a size of a log device reaching a threshold, the log device being constructed and arranged to record a summary of metadata changes from a set of transactions.

15. The device according to claim 12 wherein receiving the flushing request includes:
acquiring the flushing request in response to the at least one cache region reaching a traffic limit.

16. The device according to claim 12 wherein receiving the flushing request includes:
acquiring the flushing request in response to expiration of a timer reaching a preset time.

17. An electronic device, comprising:
a processor; and
a memory coupled to the processor, the memory containing instructions stored therein, the instructions, when executed by the processor, causing the device to execute an action, the action comprising:
receiving a flushing request, the flushing request instructing to flush metadata in at least one cache region to a persistent storage device:
acquiring a plurality of target indicators, the target indicator at least indicating a type of a cache region and a block in the cache region, wherein the plurality of target indicators are classified based on types of cache regions indicated by the target indicators among the plurality of target indicators;
determining, from the plurality of target indicators, at least one target indicator of the same type as the at least one cache region; and
flushing metadata in a block indicated by the at least one target indicator:
wherein the plurality of target indicators are classified as follows:
establishing a storage queue;
storing the acquired plurality of target indicators in the storage queue;
establishing, based on the number of types of cache regions indicated by the plurality of target indicators, position queues corresponding to the number of types; and recording, based on the type of the cache region indicated by each target indicator among the plurality of target indicators, a storage position of the target indicator in the storage queue into a position queue of a corresponding type.

18. The device according to claim 17, wherein the action further comprises:
flushing, in response to the flushing request, a plurality of cache regions simultaneously for a plurality of the position queues.

19. The device according to claim 17, wherein the action further comprises:
determining whether a second block indicated by a second target indicator exists in a strip where a first block indicated by a first target indicator among the at least one target indicator is located, a first storage position of the first target indicator in the storage queue and a second storage position of the second target indicator in the storage queue being recorded in the same position queue; and
flushing, in response to determining that the second block indicated by the second target indicator exists in the strip where the first block is located, metadata in the second block and metadata in the first block using the same thread.

20. A computer program product having a non-transitory computer readable medium which stores a set of instructions to flush metadata in a file system; the set of instructions, when carried out by computerized circuitry, causing the computerized circuitry to perform a method of:
receiving a flushing request, the flushing request instructing to flush metadata in at least one cache region to a persistent storage device;
acquiring a plurality of target indicators, the target indicator at least indicating a type of a cache region and a block in the cache region, wherein the plurality of target indicators are classified based on types of cache regions indicated by the target indicators among the plurality of target indicators;
determining, from the plurality of target indicators, at least one target indicator of the same type as the at least one cache region; and
flushing metadata in a block indicated by the at least one target indicator;
wherein the plurality of target indicators are classified as follows:
establishing, based on the number of types of cache regions indicated by the plurality of target indicators, position queues corresponding to the number of types; and
putting, based on the type of the cache region indicated by each target indicator among the plurality of target indicators, the target indicator into a position queue of a corresponding type.

* * * * *